Oct. 12, 1948.   H. M. SHERIDAN   2,451,246
TOOL BIT AND HOLDER THEREFOR
Filed June 1, 1945
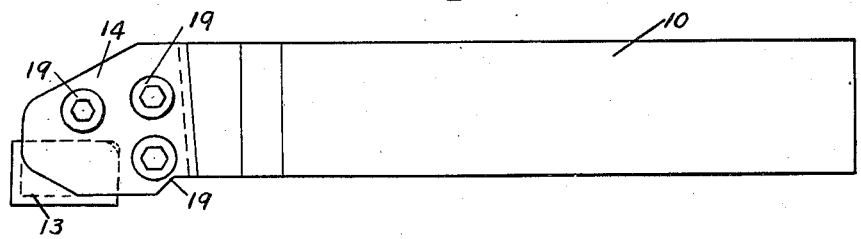
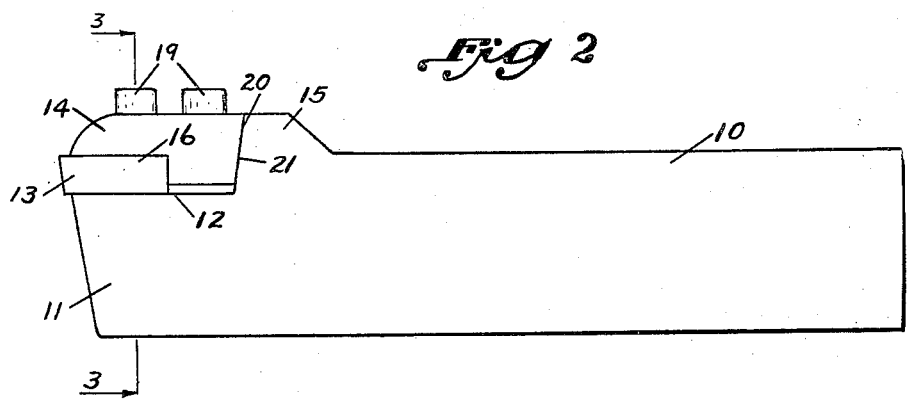
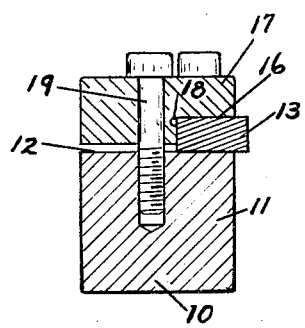
INVENTOR.
Henry M Sheridan
BY  A. T. Sperry
ATTORNEY.

Patented Oct. 12, 1948

2,451,246

UNITED STATES PATENT OFFICE 2,451,246

TOOL BIT AND HOLDER THEREFOR

Henry M. Sheridan, Erie, Pa., assignor to Apex Tool & Cutter Company, Shelton, Conn., a corporation of Connecticut Application June 1, 1945, Serial No. 597,077

2 Claims. (Cl. 29—96)

1

This invention relates to tool bits and holders therefor, and is particularly concerned with replaceable bits and their holders in which the cutting tool or bit is removably and adjustably secured within the holder, which in turn is carried by a tool feed mechanism of a machine tool.

It is among the general objects of the invention to provide means by which small pieces of relatively expensive cutting material may be presented to the work piece so as to avoid the expense of a solid one piece tool. Such so called "solid shank" tools are frequently made of a relatively inexpensive material and are provided with cutting tips of more expensive cutting material. However, such "solid shank" tools must be discarded when the tip is worn or destroyed and considerable difficulty is experienced in applying the tip and in keeping the tip in cutting condition. Such difficulties are avoided by the present construction.

It is also among the objects of the invention to provide a tool holder which is of simple design and which thus lends itself to economy of manufacture by avoiding the necessity of undercutting operations and similar intricacies of manufacture.

A further general object of the invention is to provide a tool holder which will rigidly and securely retain a cutting bit in a manner so that it may be readily presented to the work piece by the movements of a machine tool feed mechanism.

A more specific object of the invention is to provide a tool holder in which the securing means for the bit is such as to provide relief for the cutting thrust applied thereon.

Another specific object of the invention is to provide a new and improved angular relationship between the bit holding member and the tool body so as to insure a positive and chatterless retention of the bit.

Other objects and features of the invention will be apparent from a consideration of the following specification taken in conjunction with the accompanying drawing, in which:

Fig. 1 is a top plan view of one of the preferred embodiments of the present invention;

Fig. 2 is a side elevation of that form of the invention shown in Fig. 1, and

Fig. 3 is a section taken on the line 3—3 of Fig. 2.

The herein disclosed embodiment of the present inventive concept may be generally defined as comprising a holder shank or body provided with a simple planular tool bit platform at one end.

2

The inner face of the platform is defined by a wall formed by the shank which is angularly disposed transversely of the tool in both a vertical and a horizontal plane. Cooperating therewith is a bit clamp which is recessed to receive therein a substantial mass of the bit and is provided with a rear wall cooperating in angularity with the aforementioned wall of the shank, the combined angularity being such as to give a biasing characteristic to the cutting thrust imposed upon a bit mounted on a platform and within the clamp.

Referring more specifically to the drawing, it will be seen that the present embodiment of the invention comprises a simple elongated rectangular body or shank 10 which may, of course, be modified to accommodate itself to specific situations as by being angularly disposed with respect to its head 11 or provided with a goose neck or the like. The head 11 which is here shown as merely the extended left end of the body 10 provides a bit table 12 which is formed by a plain transverse surface preferably below the top surface of the body. If desired, the surface 12 may be provided with serrations with which like serrations of a tool bit 13 may cooperate. The bit 13 may be of various designs but is here shown as a simple rectangular piece of cutting material such as carbide steel and it is arranged on the table 12 to extend beyond the side edges thereof, both longitudinally and transversely so as to provide cutting edges both parallel and transverse to the axes of the head 11 of the shank 10.

For rigidly securing the bit 13 on the table 12 and fixedly with respect to the head 11 a clamp 14 is provided, the upper surface of which may conveniently be parallel to the upper surface 15 of the head 11. The under surface of the clamp 14 is provided with a rabbeted recess as indicated at 16, the recess including longitudinally and transversely inclined walls which are conformed to the inner longitudinal and transverse walls of the bit 13 and the recess provides an overhanging lip 17 which is joined with the side walls by a radius 18, the arrangement being such that the bit will securely seat within the recess whereby upon tightening of the clamp the bit will be securely retained without the possibility of vibrations thereof with respect to the shank.

The clamp 14 is of a thickness slightly less than the distance between the platform 12 and the surface 15, and securing screws 19 are provided for retaining the clamp against the upper surface of the bit. There being provided three such screws, two of which are in line with the longitudinal and transverse surface of the bit while the third is preferably in line with the diagonal taken through the bit. While the screws are here shown as simple machine screws, the securement of the clamp may be had by modified locking means such as may be flush with the top surface of the clamp or which may engage the clamp inwardly by extending up from the bottom of the head 11.

The clamp 14 is provided with an inner wall 20 which extends transversely of the head 11 and is included at a small angle preferably in the nature of 5° from the vertical and is likewise extended at a similar angle to the true transverse of the head. The table 12 terminates in a similar wall 21, the angularity of which is the same as the angularity of the wall 20 and cutting thrust applied to the bit 13 both inwardly and transversely, will thus be relieved by the joint angularly between the walls 20 and 21. This angularity of the walls is such as to transfer or bias the direct thrust to a vector component other than a pure transverse or longitudinal thrust and in this manner the securement of the bit within the body is protected from strains which would otherwise tend to loosen the body and permit chattering therein within the holder.

In carrying out the present invention, it will of course be understood that numerous changes, modifications and the full use of equivalents may be resorted to without departure of the spirit or scope of the invention as set forth in the appended claims.

What I claim is:

1. A tool holder comprising a shank having an extended portion providing a flat seat with a terminal wall extending in a single plane from said seat, said plane being inclined rearwardly from the plane of the seat and also extending diagonally across said seat, a bit clamp mounted over said seat having a rear wall snugly embracing and conforming to said terminal wall and having an open sided bit receiving recess therein extending inwardly in the direction of said diagonal wall and forming in combination with said seat a bit pocket having a top, bottom, inner end and side wall, and means for forcing said clamp towards said seat.

2. A holder as set forth in claim 1 in which the inner end and side wall of the bit pocket are in planes substantially perpendicular and parallel to the axis of the holder shank respectively.

HENRY M. SHERIDAN.

REFERENCES CITED

The following references are of record in the file of this patent:

UNITED STATES PATENTS

| Number | Name | Date |
|---|---|---|
| 2,166,826 | Shepherd | July 18, 1939 |
| 2,181,023 | Moore | Nov. 21, 1939 |
| 2,378,094 | Nunes-Vaz | Jan. 12, 1945 |
| 2,392,285 | Gauthier | Jan. 1, 1946 |

FOREIGN PATENTS

| Number | Country | Date |
|---|---|---|
| 639,824 | France | Mar. 17, 1928 |